United States Patent
Jolly

(10) Patent No.: US 8,022,315 B2
(45) Date of Patent: Sep. 20, 2011

(54) EXTENSION TUBE FOR CONCRETE FLOOR BOXES

(75) Inventor: Robert K. Jolly, Cordova, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 437 days.

(21) Appl. No.: 12/322,127

(22) Filed: Jan. 29, 2009

(65) Prior Publication Data

US 2009/0194323 A1    Aug. 6, 2009

Related U.S. Application Data

(60) Provisional application No. 61/063,600, filed on Feb. 5, 2008.

(51) Int. Cl.
*H02G 3/18* (2006.01)
*H02G 3/08* (2006.01)

(52) U.S. Cl. ........ 174/482; 174/481; 174/487; 174/559; 220/3.2; 220/3.3; 220/3.4

(58) Field of Classification Search .......... 174/482, 174/480, 481, 50, 53, 57, 58, 490, 559–563, 174/37, 17 R, 484, 487, 486; 220/3.2–3.9, 220/4.02; 248/906; 52/220.1, 220.8
See application file for complete search history.

(56) References Cited

U.S. PATENT DOCUMENTS

| | | |
|---|---|---|
| 2,684,518 A | 7/1954 | Whitlock |
| 2,728,126 A | 12/1955 | Whitlock |
| 2,931,533 A | 4/1960 | Wiesmann |
| 3,265,349 A | 8/1966 | Hamrick |
| 3,343,704 A | 9/1967 | Terry |
| 3,346,230 A | 10/1967 | Tolf, Jr. |
| 4,012,873 A | 3/1977 | Lindner |
| 4,012,874 A | 3/1977 | Brogan et al. |
| 4,077,599 A | 3/1978 | Oland |
| 4,091,231 A | 5/1978 | Sotolongo |
| 5,007,549 A | 4/1991 | Suk |
| 5,042,673 A * | 8/1991 | McShane ................ 220/3.7 |
| 5,156,755 A | 10/1992 | Cass |
| 5,466,886 A | 11/1995 | Lengyel et al. |
| 5,679,924 A * | 10/1997 | Young et al. ............. 174/50 |
| 5,700,977 A * | 12/1997 | Ford et al. ............... 174/64 |
| 5,783,774 A | 7/1998 | Bowman et al. |
| 6,088,972 A | 7/2000 | Johanneck |
| 6,395,978 B1 | 5/2002 | Whitehead et al. |
| 6,417,446 B1 * | 7/2002 | Whitehead ............. 174/484 |
| 6,725,611 B2 | 4/2004 | DeFiglio |
| 6,786,463 B1 | 9/2004 | Collum |
| 7,186,913 B2 * | 3/2007 | Hull et al. .............. 174/50 |
| 7,193,160 B2 | 3/2007 | Dinh |
| 7,388,164 B2 * | 6/2008 | Scanzillo .............. 174/482 |

* cited by examiner

*Primary Examiner* — Angel R Estrada
(74) *Attorney, Agent, or Firm* — Hoffmann & Baron, LLP

(57) ABSTRACT

An extension tube for an electrical floor box that includes a first section and a second section. Each section has a curved wall with an interior surface and an exterior surface, a top portion, a bottom portion and first and second side edges. The bottom portion is offset radially outwardly from the top portion by a ledge and the side edges have connecting mechanisms which join the two sections together to form the extension tube. The extension tube includes a top portion and a belled bottom portion which are formed so that the top portion of one extension tube can be inserted into the bottom portion of another extension tube.

20 Claims, 9 Drawing Sheets

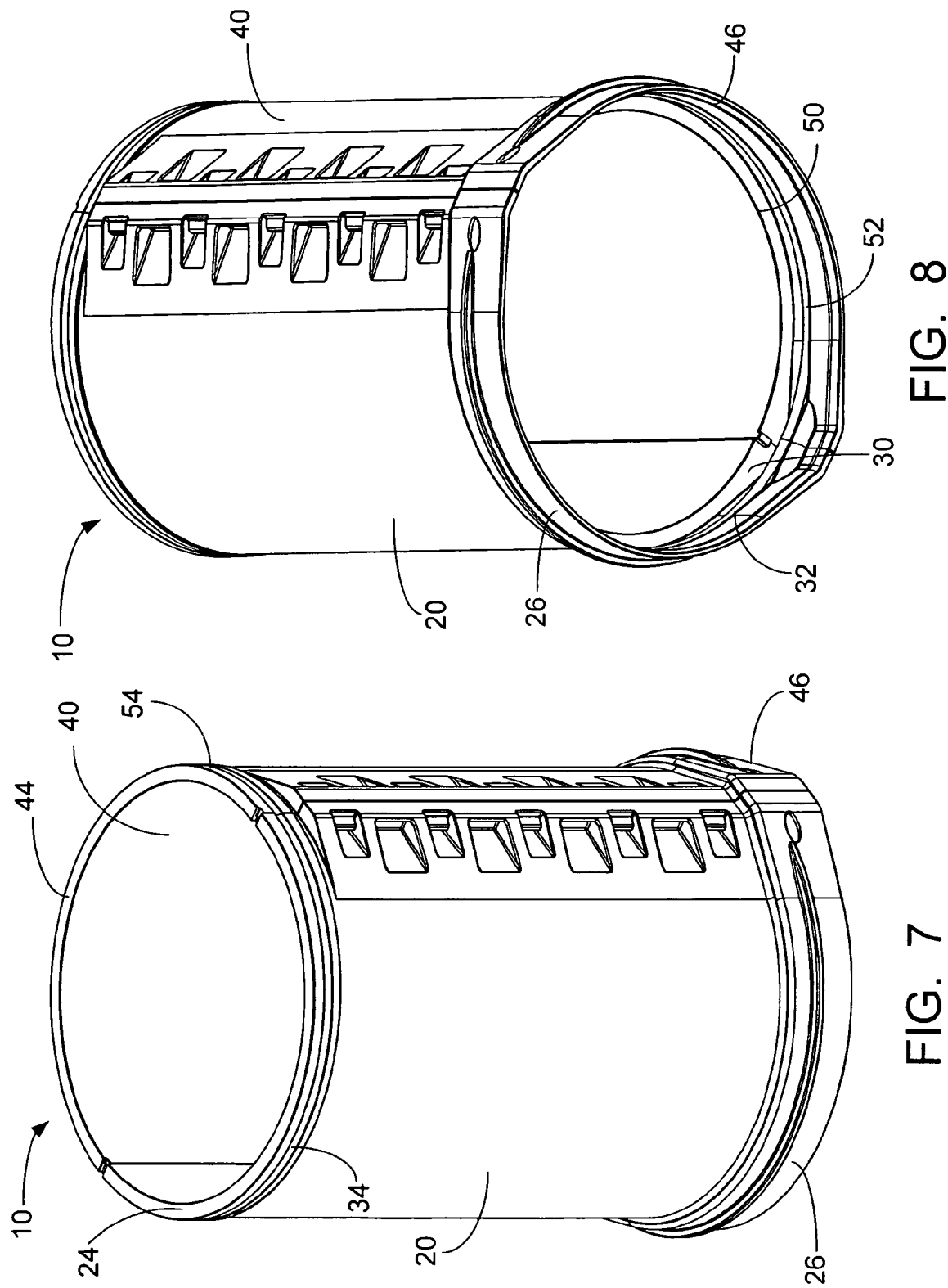

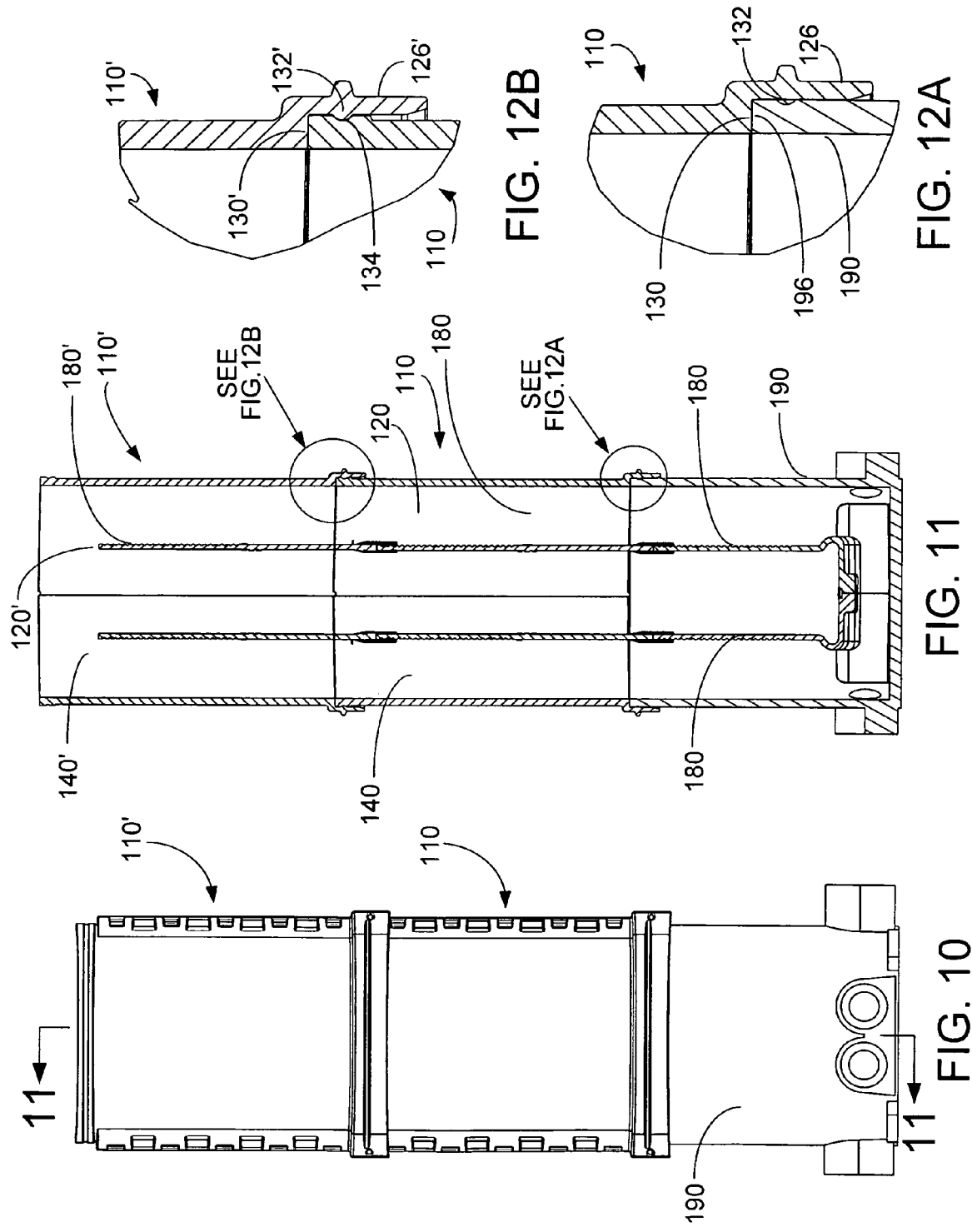

EXTENSION TUBE FOR CONCRETE FLOOR BOXES

This application claims priority from provisional application Ser. No. 61/063,600, filed on Feb. 5, 2008, which is incorporated herein in its entirety.

FIELD OF THE INVENTION

The present invention relates to electrical boxes installed in concrete floors. In particular, the present invention relates to extension tubes that allow a standard size electrical box to be installed in floors having different thicknesses.

BACKGROUND OF INVENTION

The use of an electrical junction or outlet box to accommodate electrical cable terminations is well known in the art. These boxes typically house electrical components, such as electrical receptacles, jacks and plugs and other devices. The junction box permits the electrical cables to either pass through or connect to the electrical components housed inside the box. In certain applications, these junction boxes are used in floor installations, and are referred to as floor boxes. Electrical cable distribution takes place beneath the surface of the floor and the junction boxes are designed to be supported within a poured concrete floor. One of the problems in positioning a floor box is that the installer must assure that the top of the floor box is both flush and level with the top of the poured floor in which it is set. Variations in the thicknesses of poured floors require a user to either stock several types of floor boxes with different dimensions or modify floor boxes to the requirements of a particular application.

In the prior art, it is known to provide floor boxes which are set in poured concrete floors and then sawed off to accommodate the depth of the poured floor. Examples of these cuttable floor boxes are shown in U.S. Pat. No. 3,343,704 to Terry and U.S. Pat. No. 5,466,886 to Lengyel et al. However, these cuttable floor boxes have certain disadvantages. The cuttable floor boxes typically have an open end and thus require a separate cover to protect the interior of the box from debris and extraneous concrete during pouring of the concrete floor. Furthermore, many of these cuttable floor boxes require complicated assemblies to assure that the terminations housed at the upper end of the box are level with the concrete floor. Additionally, many electrical standards, such as the National Electrical Code (NEC), require floor boxes that accommodate multiple services (e.g., power and communication services) be designed to maintain physical separation between the various services within the box.

In many floor applications, the junction box is positioned on a deck and concrete is poured over the deck to form the floor. The deck typically includes ducts, conduits or corrugations for the passage of the cables under the floor. In these applications, the junction box is positioned on the deck and connected to the duct, conduit or corrugations prior to pouring the concrete. Once the box is properly positioned, the concrete is poured onto the deck and around the junction box to form a concrete floor.

In order to accommodate variations in the poured concrete floor thickness, the junction box is typically constructed so that the upper end of the box extends above the level of the poured concrete floor. Once the concrete floor has set, the installer cuts away the portion of the box extending above the surface of the floor so that the top of the box is flush with the surface of the poured concrete floor. The cutting may be accomplished by hand sawing the extending portion of the box. During this process, especially with respect to plastic floor boxes, the sides of the box may flex under the force of the saw. This flexing can create a space between the outside walls of the box and the surrounding concrete floor. Loose pieces of concrete and other debris in the area have a tendency to back-fill into the space between the flexed wall of the box and the concrete floor. As a result of the collection of debris in the space, the wall of the box assumes a permanent internal bow or deformation, which can make internal adjustment of the box difficult to accomplish. Also, internal bowing reduces the useable interior space and makes it more difficult for the installer to make connections inside the box. This problem is especially prevalent in plastic rectangular floor boxes where the elongate side walls have a greater tendency to bow or flex either when sawed or due to the force of the poured concrete on the outside wall.

At the present time, there is no approved method for the installation of electrical boxes in thick concrete slabs, such as post-tensioned slabs. In some cases, the installer glues and/or tapes the open ends of two conventional boxes together and places them on the ground. This is primarily so that the length of the joined boxes is greater than the thickness of the concrete slab. It also serves to prevent concrete from entering the interior of the box. After the concrete is poured and set, the closed end of the box protruding from the top of the concrete is cut flush with the top surface of the slab.

It is, therefore, desirable to provide a floor box for installation in a poured concrete floor which can easily be modified to accommodate concrete floors of different thicknesses. It is also desirable to provide a floor box that can be securely anchored within a poured concrete floor without bowing or flexing of the side walls due to cutting the upper end of the box flush with the floor. Moreover, there is a need for an electrical box extension that can be used with concrete floors of different depths. Further, there is a need for a floor box with a structure that prevents concrete from entering the box.

SUMMARY OF THE INVENTION

In accordance with the present invention, an extension tube for an electrical floor box is provided. The extension tube includes a first section and a second section. Each section has a curved wall with an interior surface and an exterior surface, a top end, a bottom end, a top portion, a bottom portion, a first side edge and a second side edge. The bottom portion is offset radially outwardly from the top portion by a ledge and the side edges have connecting mechanisms which join the two sections together to form the extension tube. The extension tube includes a top portion and a belled bottom portion that are preferably cylindrical, square, rectangular, octagonal or oval in shape, most preferably cylindrically-shaped.

In one embodiment, the top portion of each section has a groove in the exterior surface extending substantially parallel to the top end and the belled bottom portion of each section has a rib on the interior surface extending substantially parallel to the bottom end. When the two sections are joined together, the grooves of the two sections form a ring groove in the exterior surface of the top portion and the ribs of the two sections form a snap ring on the interior surface of the belled bottom portion. In another embodiment, the top portion of each section has a rib on the exterior surface extending substantially parallel to the top end and the bottom portion of each section has a groove on the interior surface extending substantially parallel to the bottom end. When the two sections are joined together, the ribs of the two sections form a snap ring on the exterior surface of the top portion and the grooves of the two sections form a ring groove.

The present invention is also an extension tube assembly for an electrical floor box. The extension tube assembly includes a first section, a second section, a third section and a fourth section. Each section has a curved wall with an interior surface and an exterior surface, a top portion, a bottom portion, a first side edge and a second side edge. The bottom portion is offset outwardly from the top portion and the side edges have connecting mechanisms for joining two sections together. The first and second section are joined together to form a first extension tube having a top perimetrical edge, a top portion, a belled bottom portion and a ledge connecting the top portion and belled bottom portion. The third and fourth section are joined together to form a second extension tube having a top portion and a belled bottom portion. The top portion of the first extension tube is inserted into the belled bottom portion of the second extension tube to form the extension tube assembly.

The top portion of each section can include a groove extending circumferentially on the exterior surface and the bottom portion of each section can include a rib extending circumferentially on the interior surface. When the sections are joined together to form the first and second extension tubes, the grooves of the sections form a ring groove on the top portion of each extension tube and the ribs of the sections form a snap ring on the bottom portion of each extension tube. The ring groove of the first extension tube engages the snap ring of the second extension tube when the top portion of the first extension tube is inserted into the belled bottom portion of the second extension tube.

In another embodiment, the top portion of each section can include a rib extending circumferentially on the exterior surface and the bottom portion of each section can include a groove extending circumferentially on the interior surface. When the sections are joined together to form the first and second extension tubes, the ribs of the sections form a snap ring on the top portion of each extension tube and the grooves of the sections form a ring groove on the bottom portion of each extension tube. The snap ring of the first extension tube engages the ring groove of the second extension tube when the top portion of the first extension tube is inserted into the belled bottom portion of the second extension tube.

When the top portion of the first extension tube is inserted into the belled bottom portion of the second extension tube, the ledge of the second extension tube, which is formed by the offset between the top and bottom portions of the sections, contacts the top perimetrical edge of the first extension tube. This allows downward forces exerted on the second extension tube to be transferred to the first extension tube. The ledge also prevents the second extension tube from telescoping over the first extension tube.

The connecting mechanisms can be formed by a plurality of apertures in the first side edge and a plurality of dowel pins correspondingly extending from the second side edge. Each of the two side edges can also have one or more apertures and one or more dowel pins that correspond to dowel pins and apertures on the other side edge of the section. When the two sections are joined together to form the extension tube, the plurality of apertures receive the plurality of dowel pins.

The connecting mechanisms can also be formed by a plurality of slots in the first side edge and a plurality of tabs correspondingly extending from the second side edge. Each side edge can also have a combination of one or more slots and one or more tabs that correspond to tabs and slots on the other side edge of an opposing section. Each tab terminates at an end and, preferably, has a barb on the end. When the two sections are joined together to form the extension tube, the slots are received by the tabs and the barbs secure the tabs in the slots. In another embodiment, the connecting mechanisms are formed by one or more apertures, dowel pins, slots or tabs or a combination of two or more thereof in or extending from the first side edge and one or more apertures, dowel pins, slots or tabs or a combination of two or more thereof in or extending from the second side edge. The apertures are correspondingly located and receive the dowel pins and the slots are correspondingly located and receive the tabs when the two sections are joined together to form the extension tube. Other well known methods of joining the side edges are equally suitable for this task.

Preferably, the first and second extension tubes are substantially cylindrical in shape but other shapes such as oval, square, rectangular, hexagonal, octagonal or otherwise are equally suitable. The top portion has an outer diameter which is less than the inner diameter of the bottom portion. This allows the top portion of an extension tube to be easily inserted into the bottom portion of another extension tube. This construction allows two or more extension tubes to be easily joined together. The first section and the second section that form the extension tube can be constructed from a metal or a plastic material.

BRIEF DESCRIPTION OF THE FIGURES

The preferred embodiments of the extension tube for a concrete floor box of the present invention, as well as other objects, features and advantages of this invention, will be apparent from the accompanying drawings wherein:

FIG. 7 is a top, perspective view of an embodiment of the extension tube with the two curved sections joined together.

FIG. 8 is a bottom, perspective view of the embodiment of the extension tube shown in FIG. 7 with the two curved sections joined together.

FIG. 10 is a side view of an embodiment of the extension tube which shows two extension tube sections attached to a floor outlet box.

FIG. 11 is a side sectional view of an embodiment of the extension tube which shows two extension tube sections attached to a floor outlet box.

FIG. 12A is a detail view of the embodiment of the extension tube shown in FIG. 11 showing the connection between the first extension tube and the floor outlet box.

FIG. 12B is a detail view of the embodiment of the extension tube shown in FIG. 11 showing the connection between the first and second extension tubes.

DETAILED DESCRIPTION OF THE INVENTION

Figure 1:
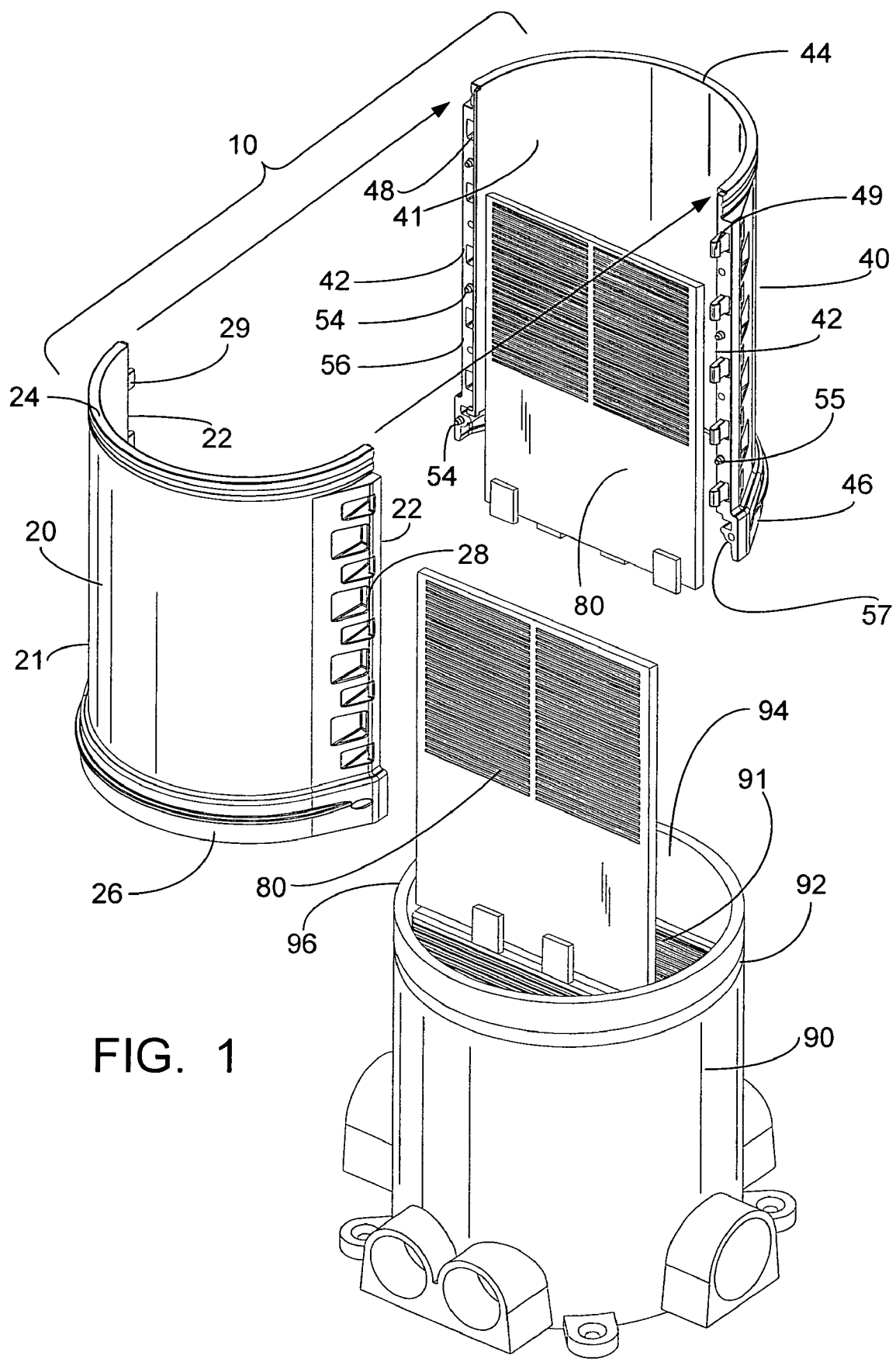
FIG. 1 is a perspective, exploded view of an embodiment of the extension tube with the two curved sections of the extension tube separated prior to being attached to a floor outlet box.

The present invention is an extension tube for an electrical floor box that is formed by first and second sections. Each section has a curved wall with an interior surface and an exterior surface, a top end, a bottom end, a top portion, a bottom portion and a pair of side edges. For the present disclosure, the extension tube is described as cylindrically-shaped. However, one skilled in the art would understand that the wall does not have to be curved and can be formed in other shapes so that, when the sections are joined together, the extension tube is square, rectangular, hexagonal, octagonal or oval in shape. The bottom portion is offset outwardly from the top portion, thereby creating a ledge. When the two sections are joined together to form the extension tube, the top portion has a ring groove on the exterior surface and the bottom portion has a snap ring on the interior surface. In some embodiments, this is reversed so that the top portion has a snap ring on the exterior surface and the bottom portion has a ring groove on the interior surface. The side edges of the sections have connecting mechanisms which join the two sections together to form the cylindrically-shaped extension tube.

The extension tube is placed over a concrete floor box and the snap ring or ring groove engages the top outside exterior wall of the floor box to secure the extension tube to the floor box with a slight interference fit. The extension tube has substantially the same interior cross-section as the floor box and increases the depth of the opening in the floor box. If additional depth is required for an application, a second extension tube can be attached to the top end of the first extension tube that is secured to the floor box. The bottom end of the second extension tube is fitted over the top end of the first extension tube so that the snap ring (or ring groove) in the second extension tube engages the ring groove (or snap ring) at the top end of the first extension tube. In this manner, as many extension tubes as needed can be connected to achieve any desired depth. The construction of the extension tubes allows the connection between the extension tube and the box or between two extension tubes to be made without the use of adhesives (e.g., PVC cement) and/or tape. However, if desired, the user can also use adhesives and/or tape to secure the connections.

The extension tube is used with concrete floor boxes (e.g., Model No. 68-P Nonmetallic Floor Box manufactured by Thomas & Betts) installed in floors with thick concrete slabs that exceed the depth of the floor box. When attached to a floor box, the extension tube increases the depth of the box so that the opening extends at least to the surface of the concrete floor. Because the extension tubes can be easily and quickly installed on a floor box without the need for PVC cement or tape, installation time is reduced. In addition, the extension tubes can be easily manufactured so that the tooling and manufacturing costs are less than prior art devices.

In a preferred embodiment, the extension tube is formed from two curved sections with opposing side edges, which are joined together at the edges along the longitudinal axis prior to installation on a concrete floor box to form the cylindrically-shaped extension tube. The two sections can be joined together using connecting mechanisms such as fasteners, snaps, tongue-and-groove connectors, tab-and-slot connectors, dowel pin-and-aperture connectors, adhesives, cements or other types of connectors. Preferably, the connecting mechanisms that secure the sections together are a plurality of corresponding apertures and dowel pins, a plurality of corresponding slots and tabs in the side edges, or a combination thereof. As discussed above, each of the edges can include both slots and tabs and apertures and dowel pins that correspond to tabs and slots and dowel pins and apertures, respectively, on the side edges of an opposing section. However, the invention is not limited by how the two sections are joined together and any method can be used that prevents the two sections from separating during use. Manufacturing the extension tube as two sections is easier and more efficient than manufacturing a single cylindrical section. In addition, forming two sections reduces tooling cost as well as eliminates the molding draft to the interior walls.

The extension tube can include an offset or "bell" configuration on the bottom end (i.e., the end that attaches to the floor box), which is used to attach and maintain concentricity with the concrete floor box. An important feature of the extension tube is that it maintains an inside wall dimension that is consistent with the inside diameter of the opening in the floor box. The consistent wall diameter is made possible by forming the extension tube using either an extrusion process or a vertical split tube mold. Manufacturing the extension tube as two sections also allows features on the interior wall of the tube (e.g., ribs, guides, graduation lines, text, and other protrusions or depressions) to be incorporated in a single manufacturing step. Including these features in a single step is not possible when the extension tube is manufactured as one piece with single part molding or extrusions processes.

The assembled extension tube has a cylindrically-shaped outer wall and is placed on top of the opening in the concrete floor box. The bottom portion of the extension tube is outwardly offset from the outer wall of the top portion and the offset forms an interior ledge. Typically, the opening in the floor box is substantially round and has a perimetrical edge. The offset portion of the extension tube fits over the opening in the floor box and the interior ledge contacts the edge of the opening of the floor box to support the extension tube. The portion of the extension tube above the offset has the same interior cross-sectional dimension as the opening in the floor box. This allows devices in the floor box to be accessed through the extension tube. The extension tube increases the depth of the floor box to accommodate thicker concrete floors which would otherwise exceed the depth of a standard concrete floor box.

The bottom portion of each of the sections is offset outwardly from the side wall. After the two sections are joined together to form the extension tube, an offset or "bell" configuration is created at the bottom of the extension tube, with a ledge formed on the interior of the extension tube at the point where the bottom portion of the extension is radially outwardly offset from the top portion. The bottom surface of the ledge extends around the entire inside perimeter of the extension tube. When the extension tube is placed over the opening in the floor box, the ledge contacts the edge around the opening in the floor box. Preferably, the mating of the extension tube and the floor box forms a "bell and spigot" joint. This design can also accommodate applications where the user desires to additionally employ an O-ring or sealant in the "bell" portion of the extension tube to provide additional sealing.

The bottom portion or "bell" portion of the extension tube is designed to press or friction fit onto the floor box. The bottom portion has an interior wall surface that fits over the exterior wall of the floor box or the top portion of another extension tube so that the extension tube is supported by the offset section (i.e., the ledge). The interior wall surface of the bottom portion can have a snap ring (also referred to herein as a lip) that extends from the surface. The snap ring is formed by ribs extending substantially parallel to the bottom end of each of the sections and can extend continuously around the inside of the interior wall of the bottom portion or it can be discontinuous. The floor box generally has smooth upper walls but it may also be constructed with a ring groove (i.e., a circumferential groove or channel) on its upper outside surface located close to the opening in the floor box. When the extension tube is placed over the floor box opening, the snap ring of the extension tube engages the ring groove, or fits tightly over and seals against the upper extension wall of the floor box when the floor box has a smooth exterior surface. This friction or press fit of the extension tube onto the box (with or without a ring groove) secures the extension tube to the floor box. One skilled in the art will appreciate that, alternatively, the snap ring can be located on the floor box and the ring groove can be located on the interior wall of the bottom portion of the extension tube. In many applications, the snap ring/ring groove alone is sufficient to connect the extension tube to the floor box and PVC glue or another type of adhesive is not required.

The top portion of the extension tube (opposite the "belled" bottom portion) can have a continuous ring groove in the exterior wall which extends circumferentially around the extension tube near the top end. This ring groove can be similar to the ring groove that may be found around the opening in the floor box and it is designed to receive the snap ring of another extension tube, similar to the manner in which the snap ring of the extension tube receives the ring groove in a floor box. The ring groove is formed by grooves extending substantially parallel to the bottom end of each of the sections. Placing a second extension tube onto an extension tube mounted on a floor box provides additional depth to the floor box for concrete floors of greater thickness. The ring groove is slightly below the top edge of the extension tube so that, when the snap ring engages the ring groove, the ledge of the second extension tube contacts the top edge of the first extension tube. As discussed above with respect to a floor box, the present invention includes embodiments wherein the ring groove is located in the interior wall of the bottom portion and the snap ring extends from the exterior surface of the top portion. When two or more extension tubes are stacked on top of each other, the snap ring-ring groove combination forms a concrete seal without the need for PVC glue or sealant to seal the joint.

The snap ring-ring groove connectors at the top and bottom of the extension tube provide a sealing barrier to prevent concrete from entering into the floor box. These connectors also provide a frictional and/or snap-on capability, which eliminates the need for applying a bonding adhesive, such as PVC glue or taping the joint, e.g., with duct tape. The snap ring-ring groove connectors allow multiple extension tubes to be stacked on top of each other in order to increase the overall depth of the floor box to meet the floor box depth requirements of any application.

Referring now to the drawings, FIG. 1 shows an embodiment of the extension tube 10 with the two curved sections 20, 40 of the extension tube 10 separated before they are joined together and attached to a floor outlet box 90. Each of the two sections 20, 40 has a curved side wall 21, 41, a top portion 24, 44, a bottom portion 26, 46 and a pair of side edges 22, 42. One of the side edges 22, 42 of each section 20, 40 has a plurality of tabs 29, 49 and the other side edge 22, 42 has a plurality of slots 28, 48, which are located to correspond to the tabs 29, 49 on the side edge 22, 42 of the mating section 20, 40. In addition to the tabs 29, 49 and slots 28, 48, both of the side edges 22, 42 have a plurality of dowel pins 54, 55 and apertures 56, 57 that are used for alignment purposes and which reduce/eliminate shear loading on tabs 29, 40. In FIG. 1, only the dowel pins 54, 55 and apertures 56, 57 on one section 40 are shown. When the two sections 20, 40 are joined together to form the extension tube 10, the tabs 29, 49 engage the slots 28, 48 and the dowel pins 54, 55 engage the apertures 56, 57 on the opposing section 20. Although tabs 29, 49 and slots 28, 48 as well as the dowel pins 54, 55 and apertures 56, 57 are used in the embodiment shown in FIG. 1, other types of connecting mechanisms can also be used to connect the two sections 20, 40.

The floor box 90 has an opening 94 in the top and the bottom end 14 (see FIG. 2) of the extension tube 10 fits over this opening 94. The bottom end 14 of the extension tube 10 fits around the outside of the opening 94 so opening at the top end 12 aligns with the opening 94 in the floor box 90 to maintain a substantially consistent cross-sectional area from inside the floor box 90 to the top end 12 of the extension tube 10. The floor box 90 can have one or more voltage dividers 80, which form separate passages 91 in the floor box 90 that electronically isolate wiring (not shown) having different voltages.

Figure 2:
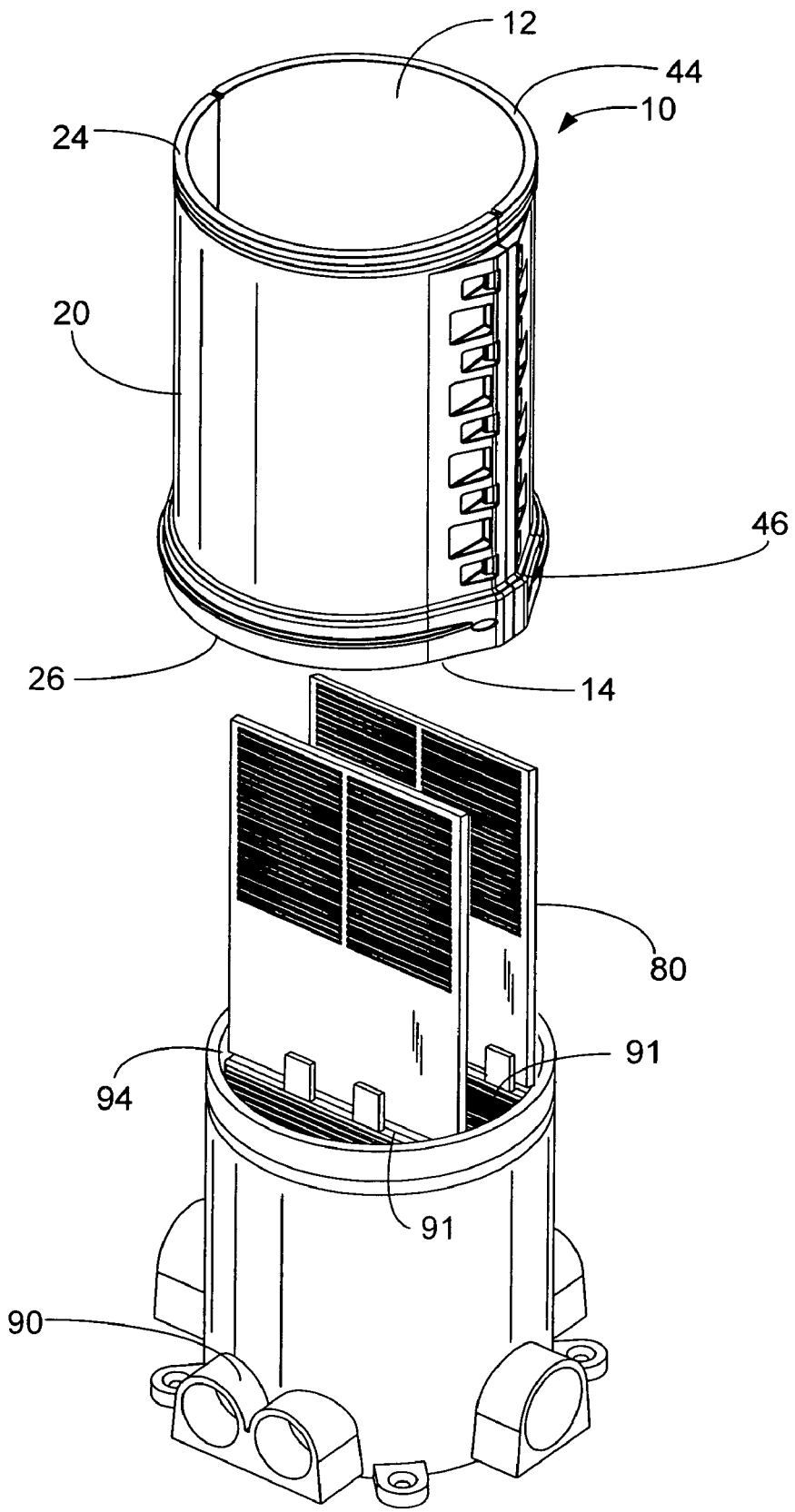
FIG. 2 is a perspective view of the embodiment of the extension tube shown in FIG. 1 showing the two curved sections joined together prior to being attached to the floor outlet box.

FIG. 2 shows the extension tube 10 in FIG. 1 after the two curved sections 20, 40 are joined together to form the extension tube 10 before it is attached to the floor outlet box 90. Additional voltage dividers 80 can be stacked so that they extend above the opening 94 in the floor box 90 to separate wires having different voltages that pass through the extension tube 10. These additional voltage dividers 80 are directly mounted onto the voltage dividers 80 in the floor box 90.

Figure 3:
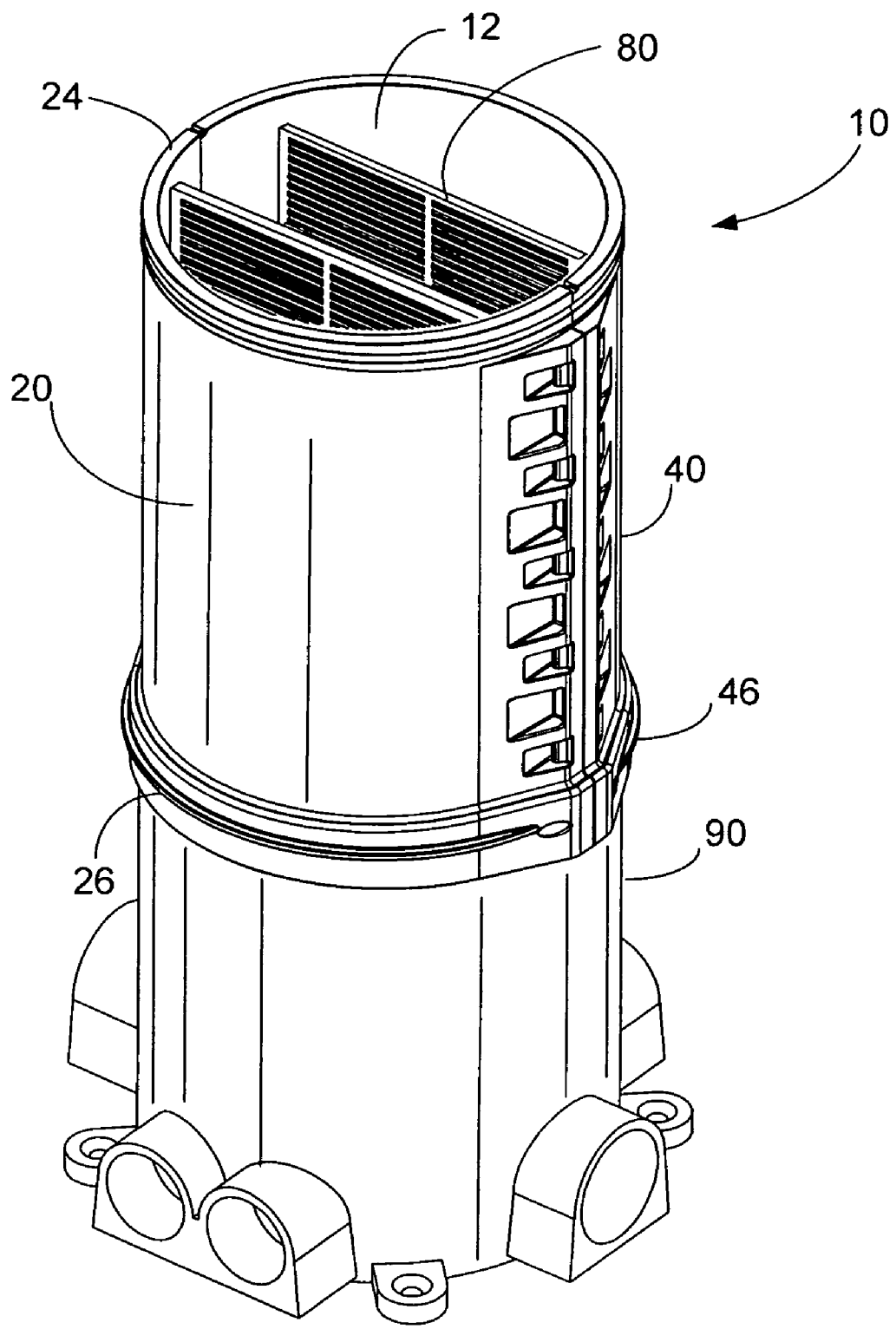
FIG. 3 is a perspective view of the embodiment of the extension tube shown in FIG. 1 after the two curved sections are joined together and attached to the floor outlet box.

FIG. 3 shows the extension tube 10 of FIG. 2 attached to the floor outlet box 90. The bottom portion 26, 46 of the extension tube 10 fits over the opening 94 (see FIG. 2) in the outlet box 90 and the voltage dividers 80 extend to about the top end 12 of the extension tube 10.

Figure 4:
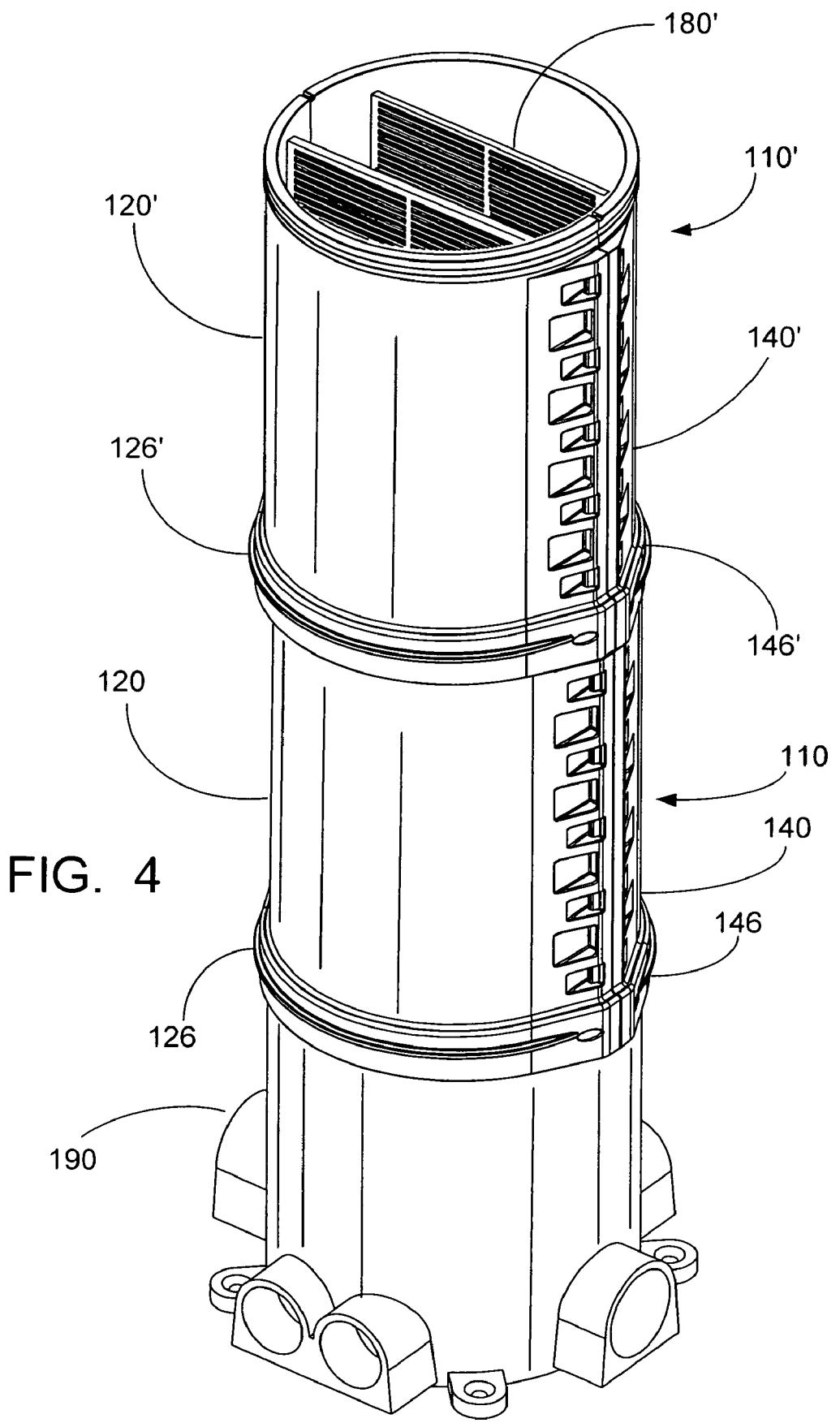
FIG. 4 is a perspective view of an embodiment of the extension tube showing two extension tubes attached to a floor outlet box.

FIG. 4 shows two extension tubes 110, 110' attached to a floor box 190. The bottom portion 126, 146 of the first extension tube 110 fits over the opening in the floor box 190 and the bottom portion 126', 146' of the second extension tube 110' fits over the top of the first extension tube 110. Voltage dividers 180' are installed to separate wires of different voltages passing through the second extension tube 110'.

Figure 5:
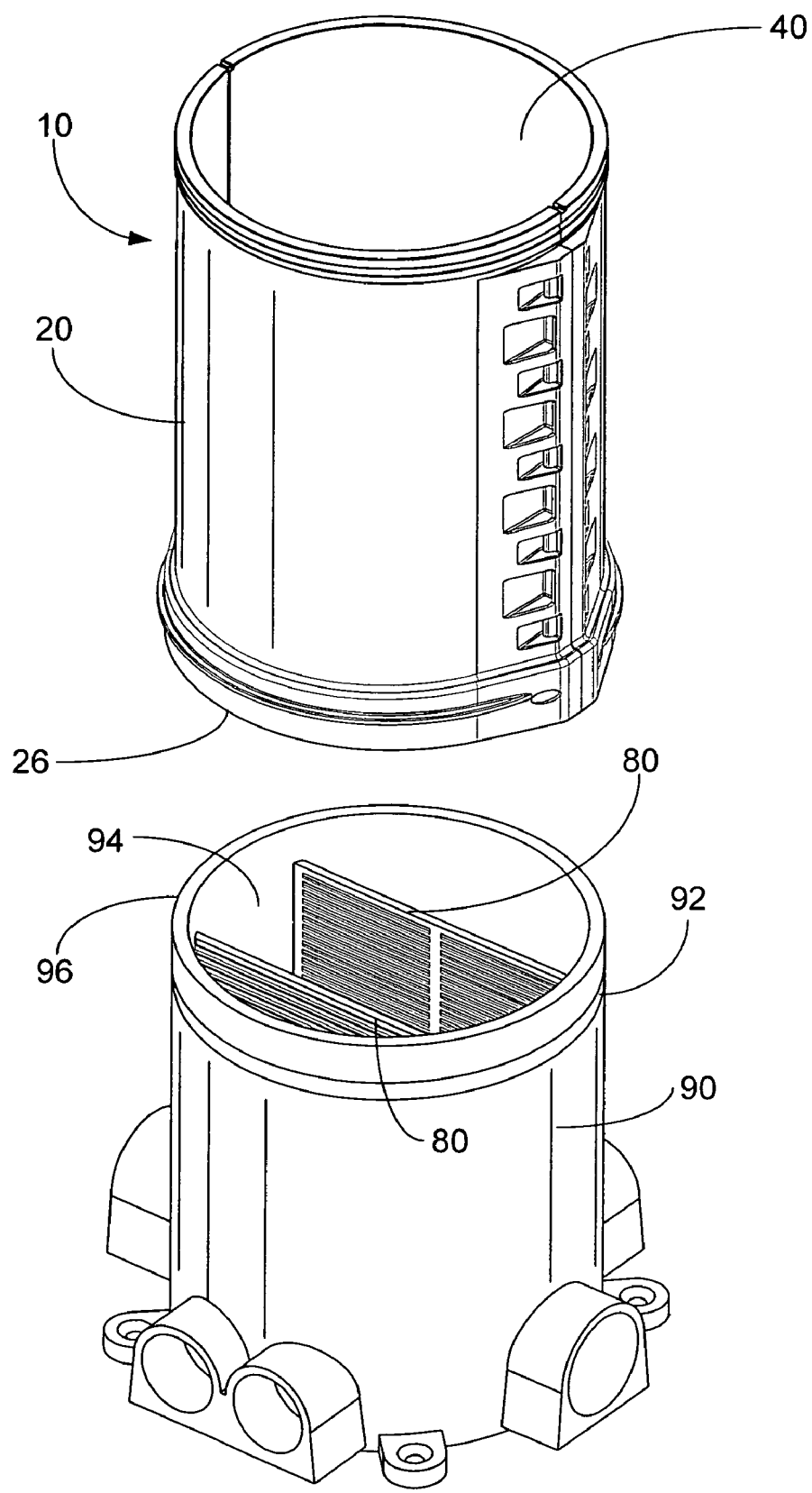
FIG. 5 is a perspective view of the embodiment of the extension tube shown in FIG. 1 after the two curved sections are joined together and attached to the floor outlet box.

FIG. 5 shows the extension tube 10 in FIG. 1 before it is attached to the floor outlet box 90. The voltage dividers 80 are installed in the floor box 90 through the opening 94 and additional voltage dividers 80 can be added after the extension tube 10 is attached. The floor box 90 can have a ring groove 92 which preferably extends around the entire circumference on the exterior surface of the wall. The ring groove 92 engages the snap ring 32, 52 on the interior wall of the bottom portion 26, 46 of the extension tube 10 (see FIG. 8). When the extension tube 10 is attached to the floor box 90, the ring groove 92 can engage the snap ring 32, 52 to secure the extension tube 10 to the floor box 90, or the snap ring 32, 52 can create an interference fit on the outside wall of the floor box 90.

Figure 6:
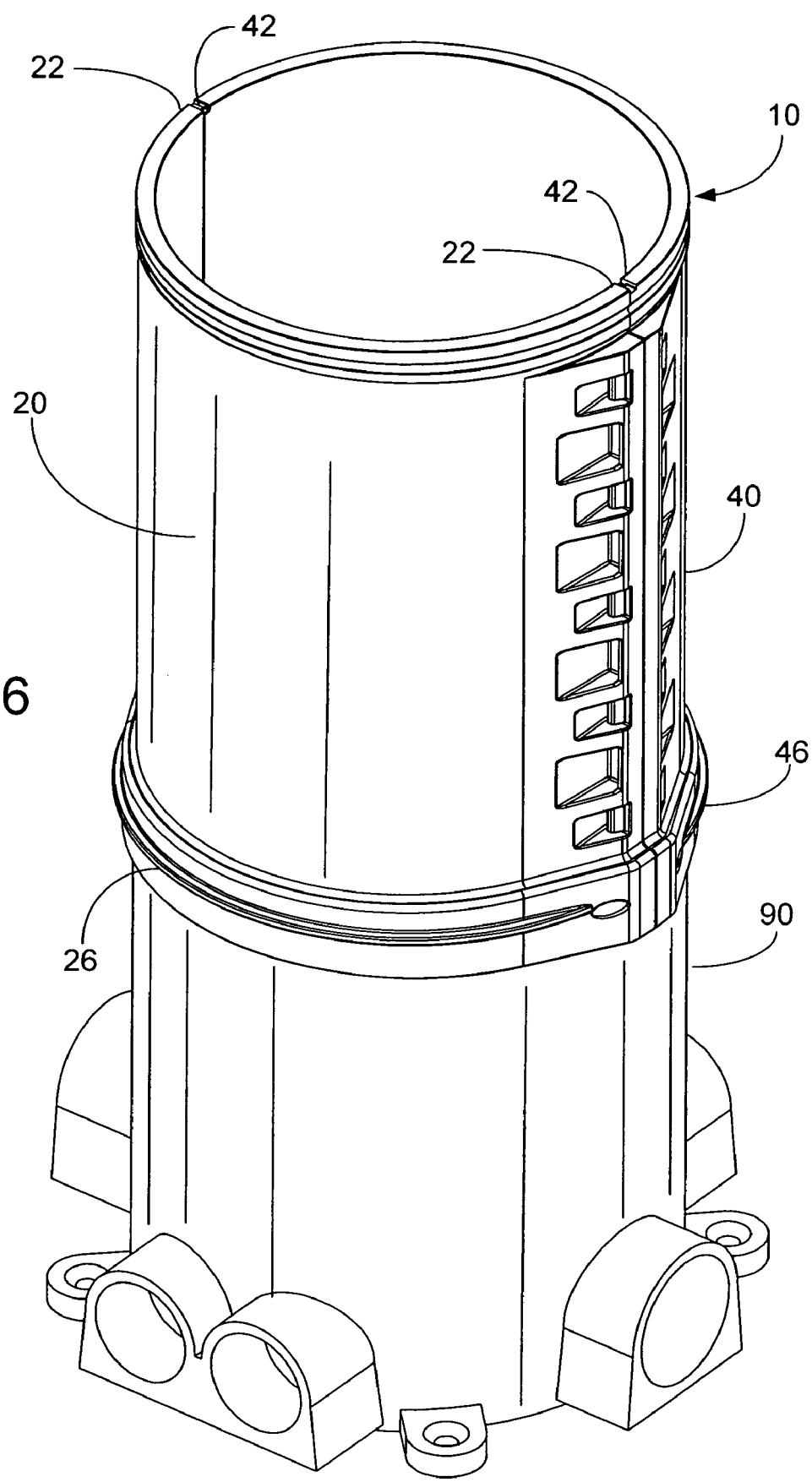
FIG. 6 is a perspective view of the embodiment of the extension tube shown in FIG. 1 after the two curved sections are joined together and attached to the floor outlet box.

FIG. 6 shows an embodiment of the extension tube 10 attached to a floor outlet box 90. The two sections 20, 40 are connected by the tabs 29, 49 and slots 28, 48 (see FIG. 1) on the side edges 22, 42 and the bottom portion 26, 46 of the extension tube 10 fit over the opening in the outlet box 90.

FIG. 7 shows the extension tube 10 after the two sections 20, 40 are joined together. This figure illustrates how the bottom portion 26, 46 of the extension tube 10 is offset outwardly from the top portion 24, 44 so that, when the extension tube 10 is fitted over a floor box 90 (see FIG. 5), the top portion 24, 44 of the extension tube 10 aligns with the opening 94 in the floor box 90. The ring groove 34, 54 around the upper end of the top portion 24, 44 is also shown.

FIG. 8 shows the interior of the bottom portion 26, 46 of the extension tube 10 with the ledge 30, 50 formed between the top portion 24, 44 and bottom portion 26, 46 of the extension tube 10. When the extension tube 10 is fitted over a floor box 90, the ledge 30, 50 contacts the edge 96 around the opening 94 in the floor box 90 (see FIG. 5). This figure also shows the snap ring 32, 52 that extends around the interior wall of the bottom portion 26, 46. The snap ring 32, 52 either engages the ring groove 92 on the floor box 90 (when the floor box is provided with a ring groove 92—see FIG. 5) or is friction fit or press fit over the outside wall of the floor box 90. When the extension tube 10 is attached to another extension tube 10, the snap ring 32, 52 engages the ring grooves 34, 54 near the top of the other extension tube 10 (see FIG. 11).

Figure 9:
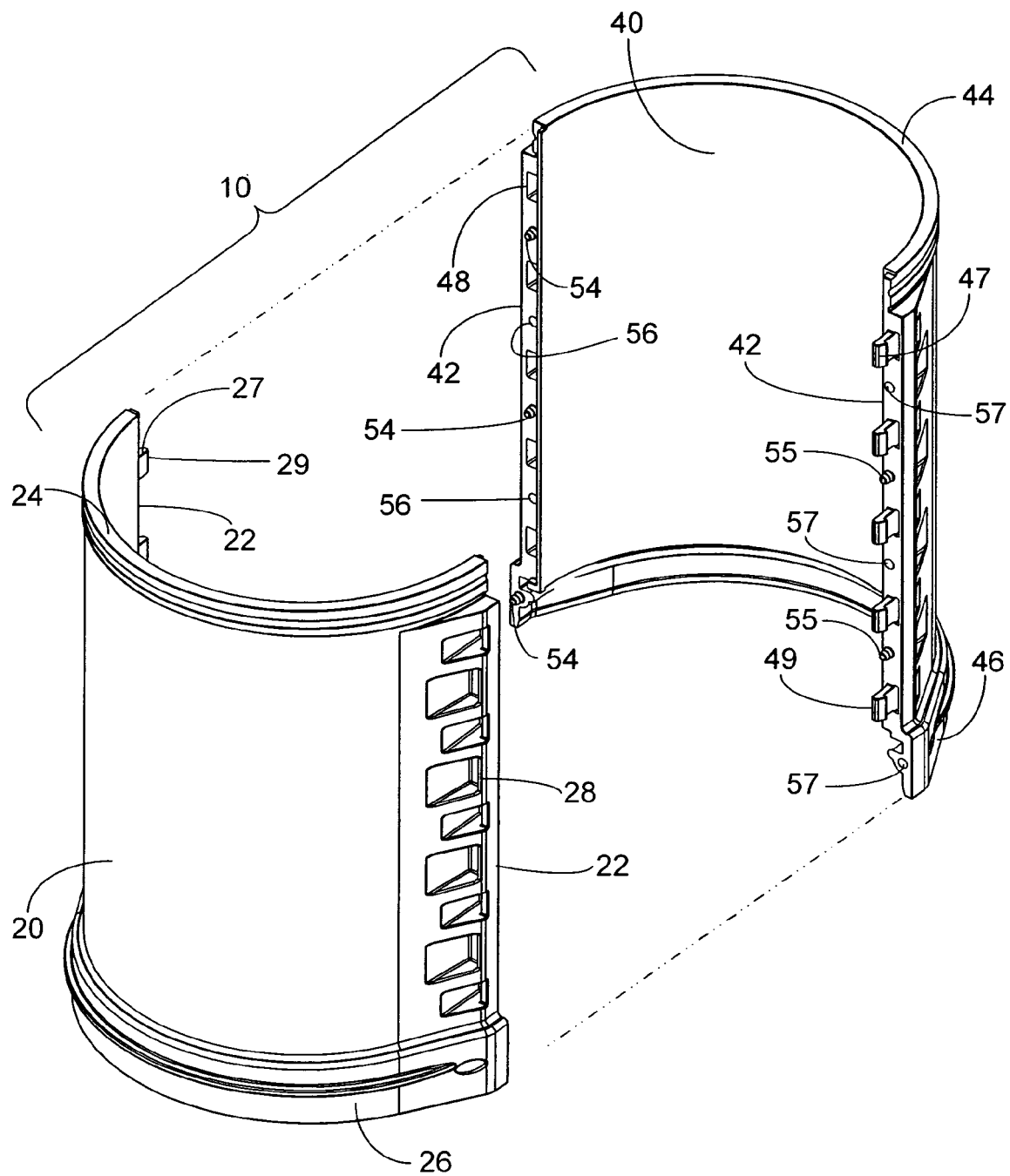
FIG. 9 is a perspective view of an embodiment of the extension tube with the two curved sections separated.

FIG. 9 shows an embodiment of the extension tube 10 before the two curved sections 20, 40 are joined together. This figure illustrates how the tabs 29, 49 correspond to the slots 28, 48 on the side edges 22, 42 of the two sections 20, 40. The ends of the tabs 29, 49 have barbs 27, 47 which secure the tabs 29, 49 in the slots 28, 48 and prevent them from being easily separated. FIG. 9 also shows the dowel pins 54, 55 and apertures 56, 57 on one section 40, which correspond to the apertures and dowel pins (not shown) on the other section 20.

FIG. 10 is a side cutaway view of an embodiment of the invention wherein two extension tubes 110, 110' are stacked together and fitted onto a floor box 190 to provide additional depth. FIG. 10 only shows two extension tubes 110, 110', however, the invention is intended to include embodiments wherein three or more extension tubes (not shown) are used.

FIG. 11 is a side sectional view of the embodiment shown in FIG. 10 showing two extension tubes 110, 110' formed by two pairs of sections 120, 120', 140, 140' attached to a floor outlet box 190. This figure also shows voltage dividers 180, 180' extending from the floor box 190 into the extension tubes 110, 110'. As additional extension tubes (not shown) are attached to the top extension tube 110', additional voltage dividers (not shown) can also be installed.

FIG. 12A shows a detail of the connection between the first extension tube 110 and the floor outlet box 190 in FIG. 11 for a floor box 190 that does not have a ring groove about its upper opening. This figure shows the press fit or friction fit seal between the snap ring 132 on the extension tube 110 and outside wall of the floor box 190. This figure also shows the ledge 130 formed by the offset of the bottom portion 126 contacting the edge 196 of the floor box 190.

FIG. 12B shows a detail of the connection between the first extension tube 110 and second extension tube 110' in FIG. 11. (This type of connection is also typical of the connection between an extension tube 10 and a floor box 90 with a ring groove 92—see FIG. 5.) The ring groove 134 in the exterior wall of the first extension tube 110 engages the snap ring 132' on the bottom portion 126' of the second extension tube 110'. For extension tubes that do not have a ring groove, the bottom portion 126' of the second extension tube 110' is friction or press fit over the top of the first extension tube. The figure also shows the ledge 130' of the second extension tube 110' resting on top of the first extension tube 110.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An extension tube for an electrical floor box, the extension tube comprising:
   a first section; and
   a second section,
   wherein each section comprises a curved wall having an interior surface and an exterior surface, a top end, a bottom end, a top portion, a bottom portion, a first side edge and a second side edge, wherein the bottom portion is offset radially outwardly from the top portion by a ledge, wherein the side edges have connecting mechanisms which join the two sections together to form the extension tube, and wherein the extension tube comprises a top portion and a belled bottom portion.

2. The extension tube according to claim 1, wherein the top portion of each section comprises a groove in the exterior surface extending substantially parallel to the top end and the belled bottom portion of each section comprises a rib on the interior surface extending substantially parallel to the bottom end, and wherein, when the two sections are joined together, the grooves in the two sections form a ring groove and the ribs on the two sections form a snap ring.

3. The extension tube according to claim 1, wherein the top portion of each section comprises a rib on the interior surface extending substantially parallel to the top end and the bottom portion of each section comprises a groove in the exterior surface extending substantially parallel to the bottom end, and wherein, when the two sections are joined together, the grooves in the two sections form a ring groove and the ribs on the two sections form a snap ring.

4. The extension tube according to claim 1, wherein the connecting mechanisms are formed by a plurality of apertures in the first side edge and a plurality of dowel pins correspondingly extending from the second side edge, or by a plurality of apertures and dowel pins in or extending from, respectively, the first side edge and a corresponding plurality of dowel pins and apertures extending from or in, respectively, the second side edge, and wherein the plurality of apertures receive the plurality of dowel pins when the two sections are joined together to form the extension tube.

5. The extension tube according to claim 1, wherein the connecting mechanisms are formed by a plurality of slots in the first side edge and a plurality of tabs correspondingly extending from the second side edge, or by a plurality of slots and tabs in or extending from, respectively, the first side edge and a corresponding plurality of tabs and slots extending from or in, respectively, the second side edge, wherein each tab terminates at an end, and wherein the plurality of slots receives the plurality of tabs when the two sections are joined together to form the extension tube.

6. The extension tube according to claim 1, wherein each of the plurality of tabs has a barb on the end, and wherein the barbs secure the tabs in the slots.

7. The extension tube according to claim 1, wherein the connecting mechanisms are formed by one or more apertures, dowel pins, slots or tabs or a combination of two or more thereof in or extending from the first side edge and one or more apertures, dowel pins, slots or tabs or a combination of two or more thereof in or extending from the second side edge, and wherein the apertures are correspondingly located and receive the dowel pins and the slots are correspondingly located and receive the tabs when the two sections are joined together to form the extension tube.

8. The extension tube according to claim 1, wherein the top portion has an outer diameter and the bottom portion has an inner diameter, and wherein the outer diameter of the top portion is less than the inner diameter of the bottom portion.

9. The extension tube according to claim 1, wherein the first section and the second section are constructed from a metal or a plastic material.

10. An extension tube assembly for an electrical floor box, the extension tube assembly comprising:
   a first section;
   a second section;
   a third section; and
   a fourth section,
   wherein each section comprises a curved wall having an interior surface and an exterior surface, a top portion, a bottom portion, a first side edge and a second side edge, wherein the bottom portion is offset outwardly from the top portion, wherein the side edges have connecting mechanisms for joining two of the sections,
   wherein the first and second section are joined together to form a first extension tube having a top perimetrical edge, a top portion, a belled bottom portion and a ledge connecting the top portion and belled bottom portion, and wherein the third and fourth section are joined together to form a second extension tube having a top portion and a belled bottom portion, and wherein the top portion of the first extension tube is inserted into the belled bottom portion of the second extension tube to form the extension tube assembly.

11. The extension tube assembly according to claim 10, wherein the top portion of each section comprises a groove in the exterior surface extending substantially parallel to the top end and the bottom portion of each section comprises a rib on the interior surface extending substantially parallel to the bottom end, wherein, when the sections are joined together to form the first and second extension tubes, the grooves of the sections form a ring groove on the top portion of each extension tube and the ribs of the sections form a snap ring on the bottom portion of each extension tube, and wherein the ring groove of the first extension tube engages the snap ring of the second extension tube when the top portion of the first extension tube is inserted into the belled bottom portion of the second extension tube.

12. The extension tube assembly according to claim 10, wherein the top portion of each section comprises a rib on the exterior surface extending substantially parallel to the top end and the bottom portion of each section comprises a groove in the interior surface extending substantially parallel to the bottom end, wherein, when the sections are joined together to form the first and second extension tubes, the ribs of the sections form a snap ring on the top portion of each extension tube and the grooves of the sections form a ring groove on the bottom portion of each extension tube, and wherein the snap ring of the first extension tube engages the ring groove of the second extension tube when the top portion of the first extension tube is inserted into the belled bottom portion of the second extension tube.

13. The extension tube assembly according to claim 10, wherein the first and second extension tubes are substantially cylindrical, square, rectangular, octagonal or oval in shape.

14. The extension tube assembly according to claim 10, wherein the ledge of the second extension tube contacts the top perimetrical edge of the first extension tube when the top portion of the first extension tube is inserted into the belled bottom portion of the second extension tube.

15. The extension tube assembly according to claim 10, wherein the connecting mechanisms are formed by a plurality of apertures in the first side edge and a plurality of dowel pins correspondingly extending from the second side edge, and wherein the plurality of apertures receive the plurality of dowel pins when the two sections are joined together to form the extension tube.

16. The extension tube assembly according to claim 10, wherein the connecting mechanisms are formed by a plurality of slots in the first side edge and a plurality of tabs correspondingly extending from the second side edge, wherein each tab terminates at an end, and wherein the plurality of slots receives the plurality of tabs when the two sections are joined together to form the extension tube.

17. The extension tube assembly according to claim 10, wherein each of the plurality of tabs has a barb on the end, and wherein the barbs secure the tabs in the slots.

18. The extension tube assembly according to claim 10, wherein the sections are constructed from a metal or a plastic material.

19. An extension tube assembly for an electrical floor box, the extension tube assembly comprising:
   a first section;
   a second section;
   a third section; and
   a fourth section,
   wherein each section comprises a curved wall having an interior surface and an exterior surface, a top portion, a bottom portion and a first side edge and a second side edge, wherein the bottom portion is offset outwardly from the top portion, wherein the side edges have connecting mechanisms for joining two sections,
   wherein the first and second section are joined together to form a first extension tube having a top perimetrical edge, a top portion, a belled bottom portion and a ledge connecting the top portion and belled bottom portion, and wherein the third and fourth section are joined together to form a second extension tube having a top portion and a belled bottom portion, wherein the top portion of the first extension tube is inserted into the belled bottom portion of the second extension tube to form the extension tube assembly, wherein the ledge of the second extension tube contacts the top perimetrical edge of the first extension tube when the top portion of the first extension tube is inserted into the belled bottom portion of the second extension tube, wherein the connecting mechanisms are formed by a plurality of slots in the first side edge and a plurality of tabs correspondingly extending from the second side edge, wherein each tab terminates at an end, wherein the plurality of slots receives the plurality of tabs when the two sections are joined together to form the extension tube, and wherein each of the plurality of tabs has a barb on the end, and wherein the barbs secure the tabs in the slots.

20. The extension tube assembly according to claim 19, wherein the first and second extension tubes are substantially cylindrical, square, rectangular, octagonal or oval in shape and constructed from a metal or a plastic material.

* * * * *